United States Patent [19]

Thubeauville

[11] 4,412,890
[45] Nov. 1, 1983

[54] COKE OVEN BATTERY FOR PRODUCTION OF COKE AND GAS

[75] Inventor: Heinz Thubeauville, Bochum, Fed. Rep. of Germany

[73] Assignee: Dr. C. Otto & Comp. G.m.b.H., Bochum, Fed. Rep. of Germany

[21] Appl. No.: 340,005

[22] Filed: Jan. 18, 1982

[30] Foreign Application Priority Data

Mar. 24, 1981 [DE] Fed. Rep. of Germany ....... 3111476

[51] Int. Cl.³ .................... C10B 21/06; C10B 21/12
[52] U.S. Cl. .................................. 202/139; 202/142; 202/151
[58] Field of Search ............... 202/114, 139, 141–144, 202/151, 220

[56] References Cited

U.S. PATENT DOCUMENTS

| | | | |
|---|---|---|---|
| 3,366,372 | 1/1968 | Palumbo | 202/143 |
| 3,488,259 | 1/1970 | Grumm | 202/139 |
| 3,567,588 | 3/1971 | Steding et al. | 202/139 |
| 3,689,365 | 9/1972 | Steding et al. | 202/139 |
| 3,801,470 | 4/1974 | Knappstein et al. | 202/151 |
| 4,004,983 | 1/1977 | Pries | 202/142 |
| 4,244,786 | 1/1981 | Thubeauville | 202/142 |

FOREIGN PATENT DOCUMENTS

| | | | |
|---|---|---|---|
| 1059404 | 6/1959 | Fed. Rep. of Germany | 202/141 |
| 490813 | 8/1938 | United Kingdom | 202/141 |

Primary Examiner—Bradley Garris
Attorney, Agent, or Firm—Thomas H. Murray; Clifford A. Poff

[57] ABSTRACT

Hollow shaft members with orifices at different elevations throughout their heights are located in the heating flues of a coke oven battery. The shafts receive preheated gaseous combustion-supporting agents from the regenerators. Advantages include decreased midfeathers thickness, greater heating area, and having the possibility of rich-gas heating in which the flame is distributed over the whole height of the heating flue.

6 Claims, 8 Drawing Figures

COKE OVEN BATTERY FOR PRODUCTION OF COKE AND GAS

BACKGROUND OF THE INVENTION

1. Field of the Invention

This invention relates to a coke oven battery for the production of coke and gas with heating flues arranged in vertical rows between the chambers. Flues are connected to regenerators below the chambers, and preheated gaseous combustion-supporting agents are supplied stepwise to the heating flues.

2. Description of the Prior Art

A stepwise supply of preheated gaseous combustion-supporting agents is a feature of the still oven and is effected by way of passages which rise in the midfeathers and are formed with exit orifices extending to the heating flues.

Placing the passages in the midfeathers is, of course, responsible for weakening the same. This is something that must be borne in mind in the design of the walls—i.e., they must be of appropriate widths. However, increasing the thickness of the midfeathers reduces the heating-wall surface which is heated by the heating flues.

The prior art has not included the Applicant's structure for decreasing the midfeather's thickness and thereby increasing the heating-wall surface, improving the uniformity of temperature distribution over the heating wall, and providing the possibility of rich-gas heating with flames distributed over the whole height of the heating flue while maintaining a low pressure drop between the air inlet and the flue-gas passage.

SUMMARY OF THE INVENTION

Hollow shaft members with orifices at different elevations throughout their heights are located in the heating flues of a coke oven battery. The shafts receive preheated gaseous combustion-supporting agents from the regenerators. Advantages include decreased midfeathers thickness, greater heating area, and having the possibility of rich-gas heating in which the flame is distributed ove the whole height of the heating flue.

BRIEF DESCRIPTION OF THE DRAWINGS

A complete understanding of the invention may be obtained from the foregoing and following description thereof, taken together with the accompanying drawings which show an embodiment of an underjet twin-flue coke oven in accordance with the invention. In the drawings.

DESCRIPTION OF THE PREFERRED EMBODIMENT

Figure 1:
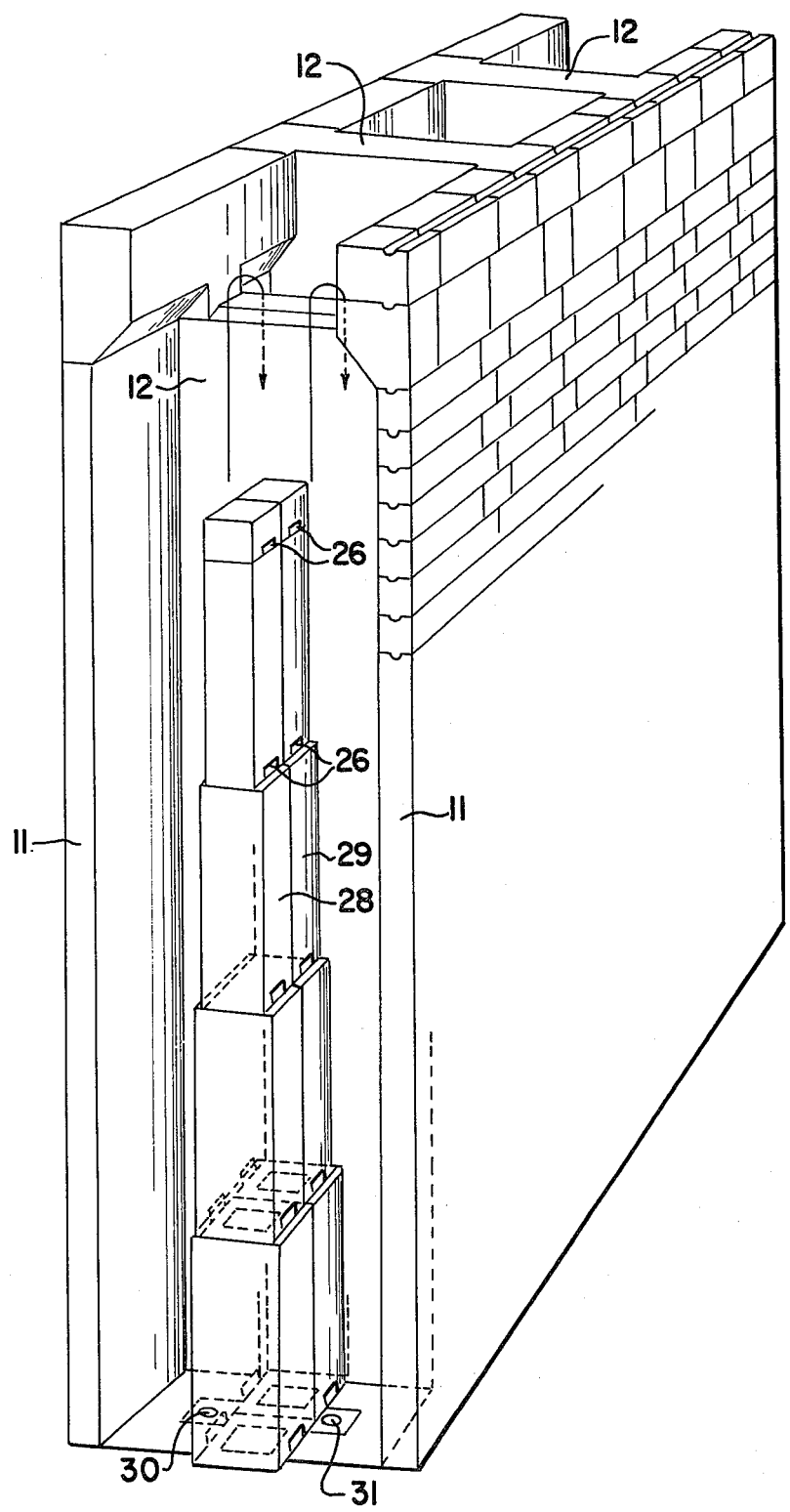
FIG. 1 is a perspective view of a vertical heating flue having disposed therein a pair of shafts through which preheated combustion-supporting agents are supplied.

The object of the invention is to provide stepwise heating of the heating flue, but not the midfeathers, by the provision of the heating flues of supply passages for preheated media.

In accordance with the invention, shafts which rise in the central region of the heating flues are connected directly to the generators below the chambers, and the shafts are formed with exit orifices distributed over their height, which exit orifices ae provided for the stepwise supply of preheated gaseous combustion agents.

In one embodiment of the invention, the shafts are of rectangular cross section and have walls extending parallel to and perpendicular to the heating-flue axis.

The shaft walls near the longitudinal heating walls can extend into recesses therein. Preferably, two rectangles arranged in laterally-inverted relationship to the vertical center plane of the heating flue form the cross section of the shafts.

The cross section of the shaft can decrease upwardly to such an extent as the throughflow quantity of preheated gaseous medium is reduced by partial outflow of the heated medium through the exit orifices. Conveniently, the cross section decreases stepwise at the locations of the exit orifices.

To insure a very low flow resistance, both for the inflow of the preheated combustion-supporting media and also for the removal of the burnt gases, the exit orifices are preferably in the form of slots which rise inclinedly from the shaft interior.

To accelerate the combination of the preheated lean gas with preheated air, the slots serving as exit orifices can extend inclinedly toward the center of the heating flue.

Rich-gas burners can be disposed between, on the one hand, the shafts, and, on the other hand, the longitudinal heating wall.

The construction permits rich-gas heating in which the rich-gas flame is distributed over the whole height of the heating flue. That is, the upper parts of the charge in the oven chambers are heated satisfactorily, and they are not cooler than the sole parts.

In an oven heated solely by a non-preheated or rich gas, a single shaft extending over the width of the heating flue can be provided for heating the air, such shaft extending on both sides into the midfeathers and being formed with exit orifices in the shaft walls near the longitudinal heating walls.

Bricks of relatively complicated shape are necessary for the heating walls and the midfeathers, the bricks keying with one another to provide a bond able to resist the various stresses; however, the shafts for the heating flues can be constructed of bricks of simple shape.

In comparison with structures heretofore known, the midfeather itself can be of reduced thickness, thus increasing the proportion of the chamber-wall surface supplied by the heating flues. This is true more particularly in the case of the non-continuous midfeathers of chamber ovens having twin flues.

Oven heating by vertical heating flues can be of any known kind. The oven can be a two-part or four-part oven, or it can have some other combination of heating flues supplied as groups in the same direction, or it can be a twin-flue oven. In a twin-flue oven, every second midfeather extends to the crown, thus providing a very stable construction.

The path of the preheated media and of the discharging burnt gases is a very simple one in the novel design, since the regenerators communicate directly with the shafts above them, so far as the media rising in the regenerator and the media discharging therein are concerned, with the result that the pressure drop between the air inlet and the flue-gas passage is reduced.

Dividing the combustion zone into the two vertical chambers disposed between the shafts and the heating wall leads to a very uniform temperature distribution. This gives a consequent reduction in the risk of local overheating and the attendant evolution of nitrogen oxide.

In the drawings, the oven chambers 10 are bounded on both sides by heating walls. There are longitudinal heating walls 11 and midfeathers 12, which subdivide each heating wall into rows of vertical heating flues 13, 14. Flues 13, 14 of each pair of twin flues are interconnected by a top bridge 15. Inspection apertures 17 in the furnace crown 16 enable each flue 13, 14 to be inspected. A pair of regenerators 18, 19 is disposed below each oven chamber 10.

The shafts through which the preheated gaseous combustion-supporting agents are introduced, and which form the main feature of the present invention, are disposed in the central region of the heating flues. The shafts are constructed from individual rectangular modules whose walls extend parallel to and perpendicular to the midfeather and from one midfeather as far as the opposite midfeather, into which they are bonded.

Figure 4:
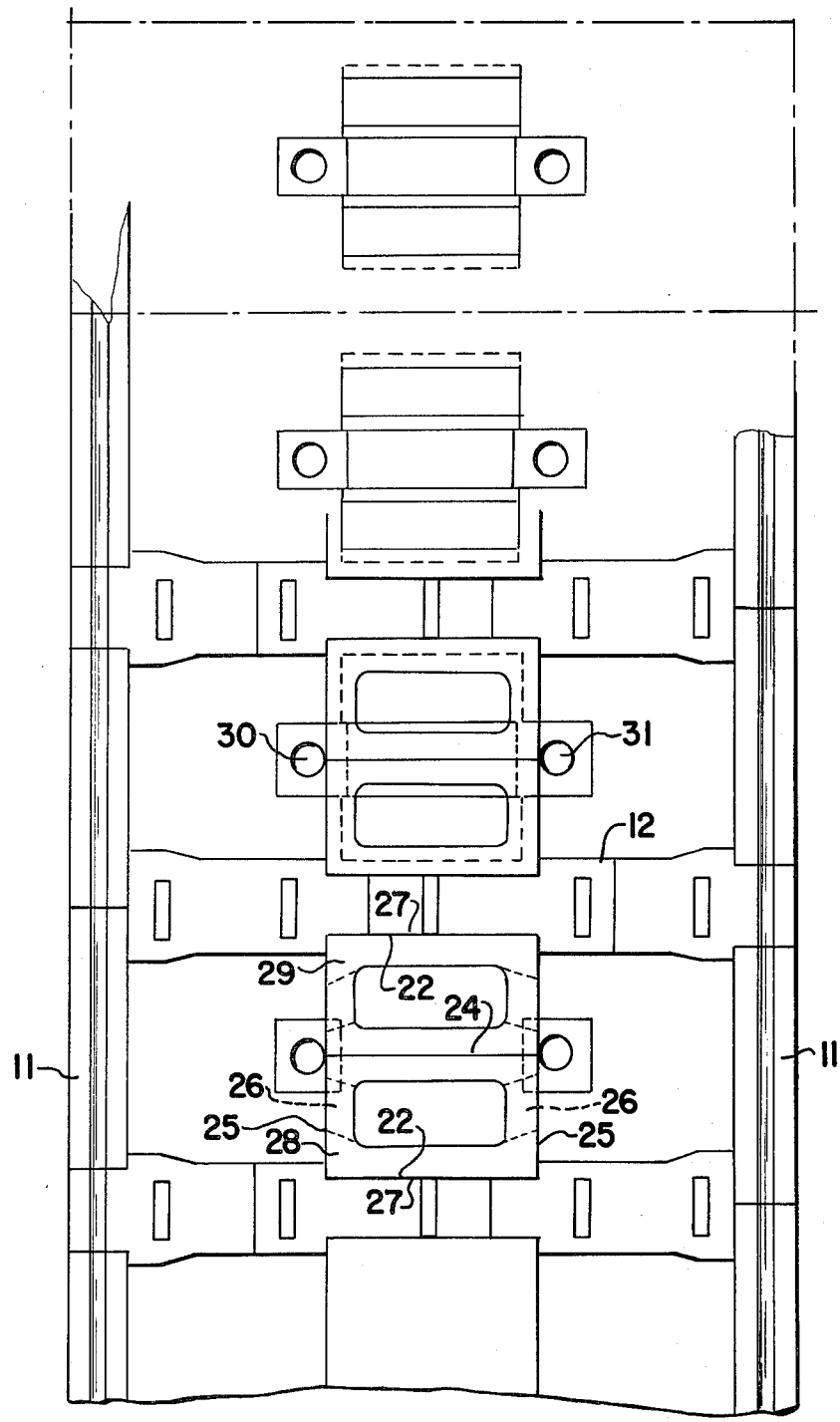
FIG. 4 is a view of the sole of the heating flues, taken on the section line IV—IV of FIG. 3.

There are two shafts 28, 29 in the oven shown in FIG. 4; in the case of lean-gas heating, the preheated lean gas is supplied through the shaft 28 and the preheated combustion-supporting air is supplied through the shaft 29. The shafts 28, 29 are directly connected to the regenerators 18, 19 by way of inclined passages 23. Unlike the known twin-flue heating system, the system in accordance with the invention is devoid of crossing passages, so that the risk of gas transfers is virtually excluded.

The discrete modules of the shafts are built up from ordinary-shaped bricks and are disposed in laterally-inverted relationship to the longitudinal axis of the heating flues. They contact the midfeather by way of their outer walls 22 and engage in a recess 27 in the midfeather. The modules bear on one another by way of their opposite walls 24. The two crosswalls 25 are formed with exit orifices 26, from which the gaseous media issue toward the longitudinal heating wall, so that the flames evolve in the chambers near to such wall.

The exit orifices are in the form of slots which extend inclinedly upwards and inclinedly laterally toward the center of the heating flue. This feature helps to reduce the flow resistance which opposes the flow of gaseous medium issuing and entering through the slots, and it helps to deflect the issuing media toward the center of the heating flue, so that combination of the combustion-supporting air with the gas is expedited on both rich-gas and lean-gas heating.

Figure 2:
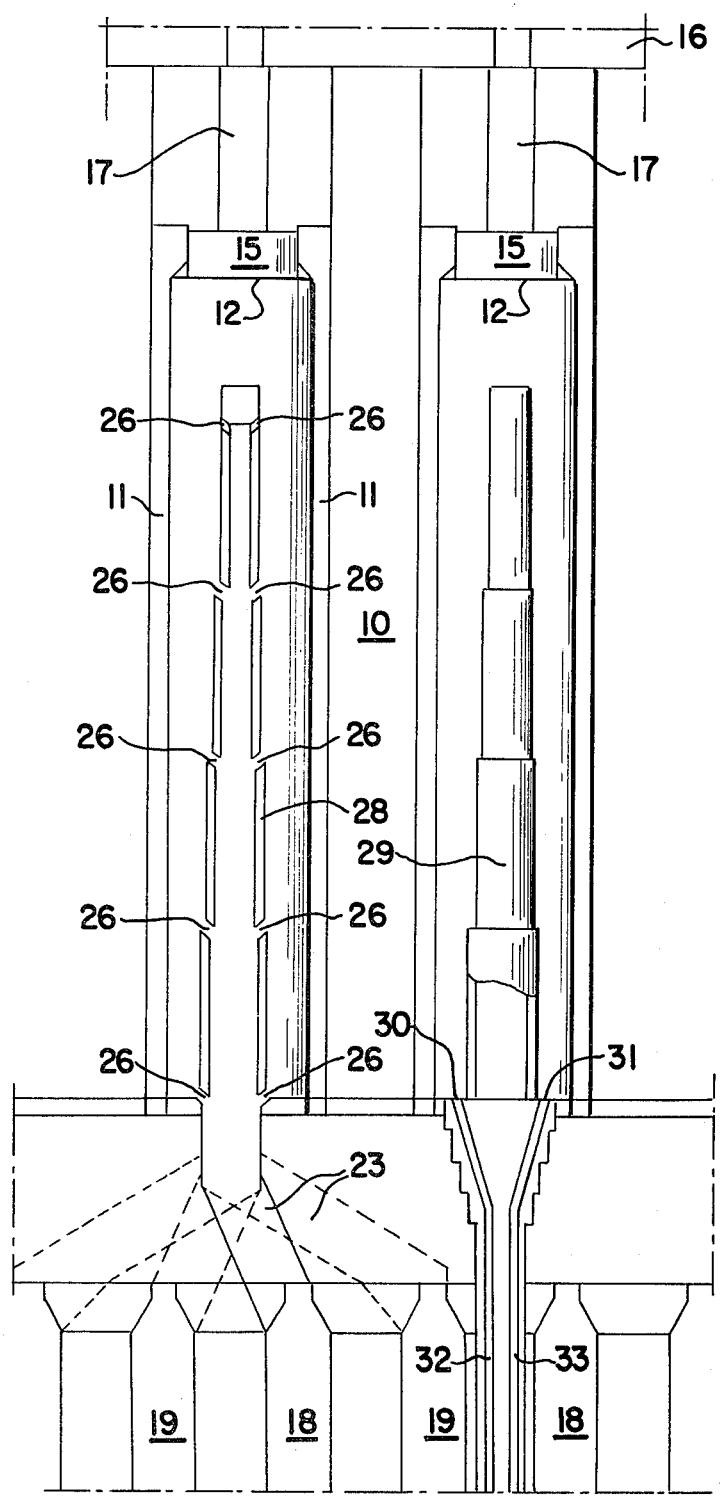
FIG. 2 is a vertical sectional view lengthwise of a coke oven battery through a horizontal coke oven and its two adjacent heating walls, heating flues being provided in the shafts and regenerators disposed therebelow, the section of the left-hand heating flue extending through the center of the shafts and the section of the right-hand heating flue extending through the rich-gas supply lines.
Figure 3:
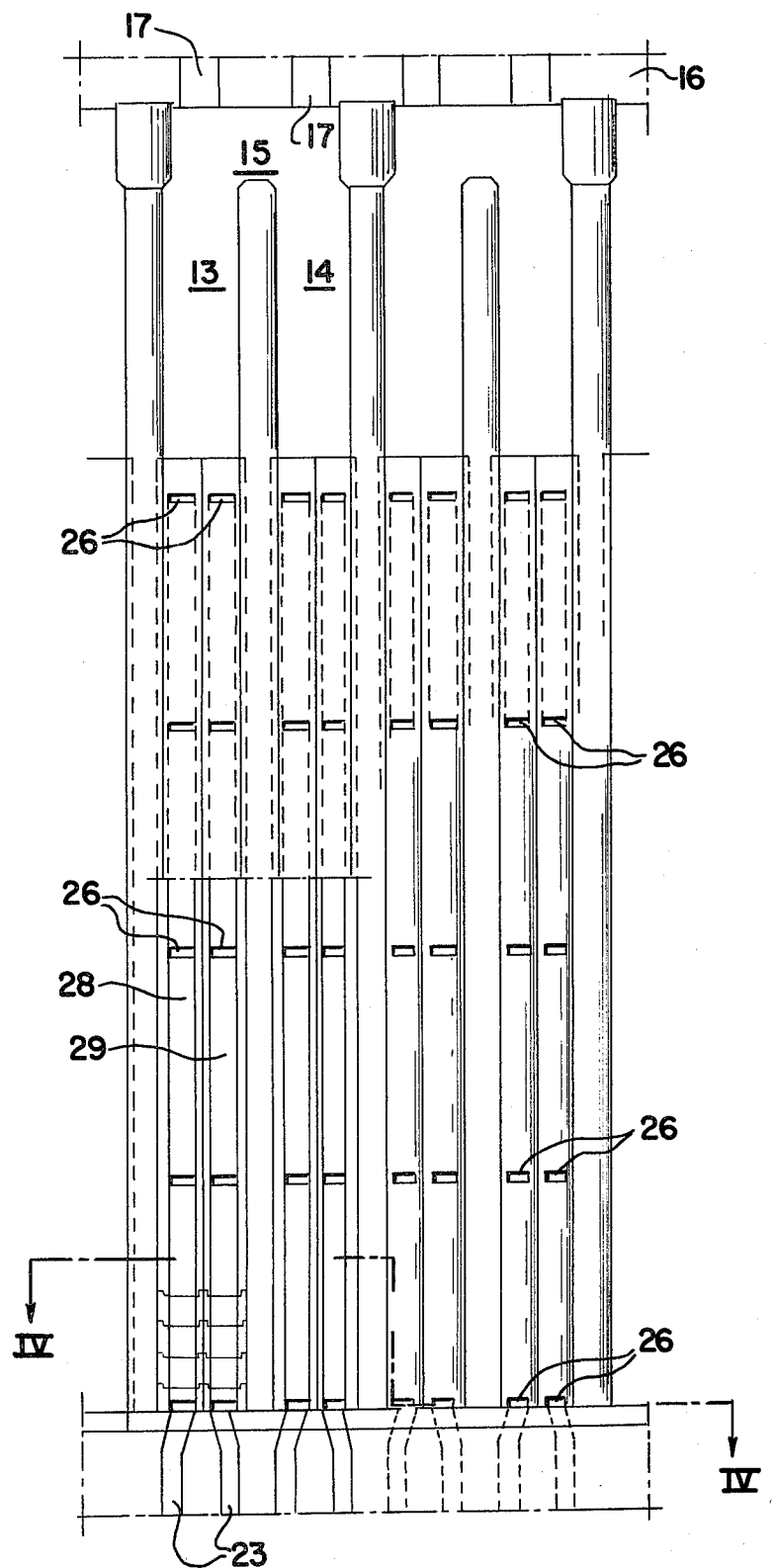
FIG. 3 is a vertical sectional view in the same battery as FIG. 2, looking along a heating-wall axis, through two adjacent pairs of vertical twin-heating flues.

The shafts 28, 29 narrow upwardly in steps. As can be gathered from FIG. 2, the modules become shorter along the heating-flue axis. The upwardly-decreasing cross section is thus adapted to the condition that the quantity of gas issuing from the exit orifices 26 decreases at each orifice further up the flue. On the other hand, the cross sections of the flue chambers in which the flames rise widen upwardly in steps, the upwardly-increasing cross section thus being adapted to the increasing quantity of burning gas.

Figure 4A:
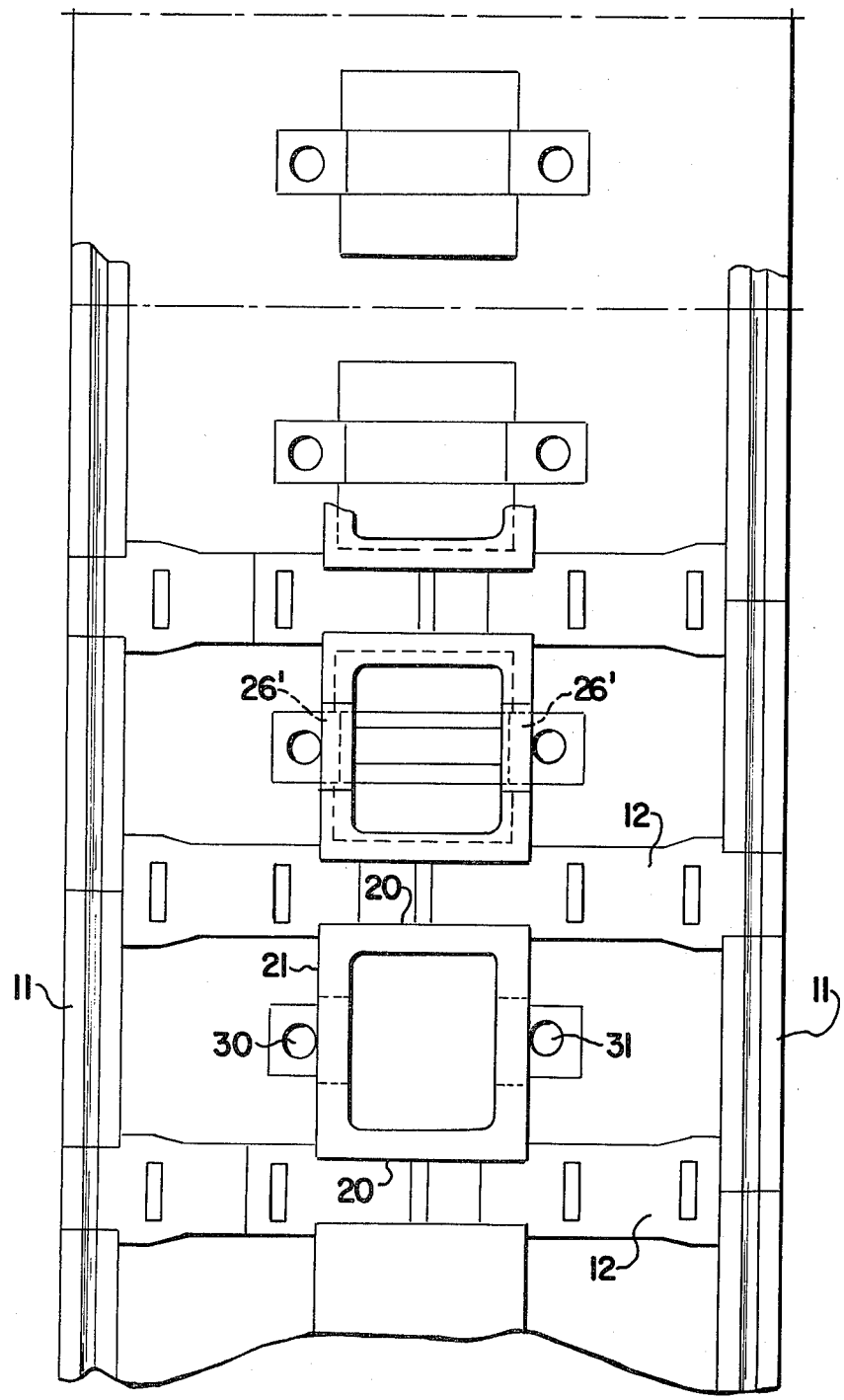
FIG. 4A is a view similar to FIG. 4 but with only one shaft in the heating flue.
Figure 5A:
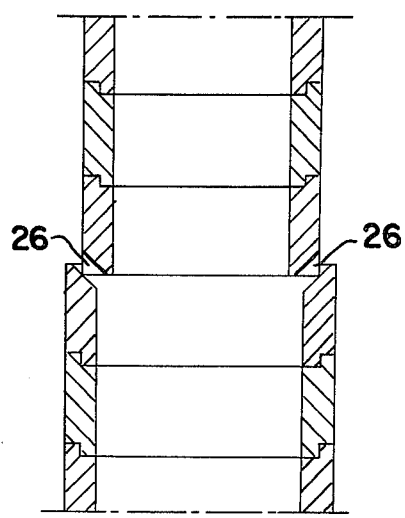
FIG. 5A is a vertical sectional view through a single shaft near the exit orifices.
Figure 5:
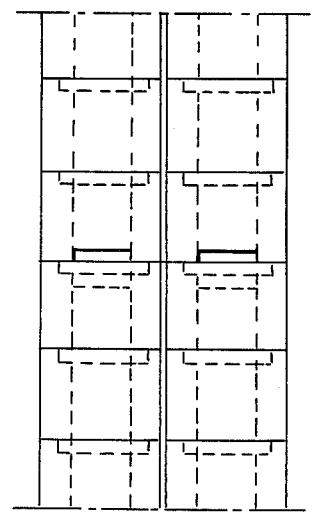
FIG. 5 is a partial view, to an enlarged scale, of two shafts, seen from the heating wall near the exit orifices.
Figure 5B:
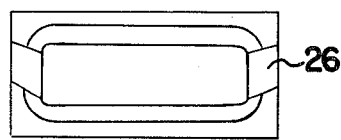
FIG. 5B is a horizontal sectional view through a single shaft.

If the oven is intended only for rich-gas heating—that is, if only air is preheated in the regenerators—instead of two shafts being provided, a single shaft having the outer wall 20 and the crosswall 21 can be provided. The outer walls are bound into the midfeathers. The exit orifices 26' (see FIG. 4A) are disposed in the crosswalls 21 on the side near the longitudinal heating wall.

Rich gas is supplied through the agency of burners 30, 31 disposed in the chambers between the shafts and the midfeather. In the oven shown, supply passages 32, 33 to the rich-gas burners extend in the partitions of the pairs of regenerators 18, 19.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. In a coke oven battery for the production of coke and gas, said coke oven battery having chambers with heating flues extending vertically between said chambers, regenerators below said chambers connected to said heating flues, midfeathers separating said heating flues from one another in the space between adjacent pairs of chambers, a plurality of hollow shaft members within said heating flues for conducting preheated gaseous combustion-supporting agents from said regenerators, said shaft members having a rectangular cross section which decreases upwardly in a stepwise fashion for correspondingly decreasing the flow of said agents while correspondingly increasing the flow space for burning of gases therein, said shaft members including first and second pairs of opposed walls extending respectively, parallel and perpendicular to the longitudinal axis of a heating flue, said first pair of walls extending into recesses in said midfeathers, and a plurality of exit orifices within said first pair of walls of said shaft members.

2. An improvement according to claim 1 characterized in that rich-gas burners are disposed between a wall of said shaft member and a wall of said heating flue which is adjacent a chamber.

3. The coke oven battery according to claim 2 wherein said first and second pairs of walls define a single internal flow space in each of said shaft members for said agents which comprise regeneratively-preheated air.

4. An improvement as defined in claim 1 characterized in that the cross section of said shaft member is decreased stepwise in the vicinity of its exit orifices.

5. The coke oven battery according to claim 1 wherein said first and second pairs of walls define two internal flow spaces in each of said shaft members, one internal flow space conducting regeneratively-preheated air and the other internal flow space conducting regeneratively-preheated fuel gas.

6. The coke oven battery according to claim 1 wherein said exit orifices are located at different steps of decreasing cross sections along the heights of said shaft members.

* * * * *